United States Patent [19]  
Takenoshita

[11] Patent Number: 4,902,024  
[45] Date of Patent: Feb. 20, 1990

[54] SPHERICAL SEALING BODY USED FOR THE EXHAUST PIPE JOINTS AND A METHOD OF MANUFACTURING THEREOF

[75] Inventor: Yukinori Takenoshita, Nakatsu, Japan

[73] Assignee: Oiles Corporation, Tokyo, Japan

[21] Appl. No.: 291,027

[22] Filed: Dec. 28, 1988

[30] Foreign Application Priority Data

Jan. 19, 1988 [JP] Japan .................................. 63-9413

[51] Int. Cl.⁴ ........................ F16J 15/12; B32B 31/06
[52] U.S. Cl. .................................... 277/204; 156/192; 156/194; 277/229; 277/DIG. 6
[58] Field of Search .................................. 156/190–192, 156/172, 173, 175, 194, 189; 277/DIG. 6, 204, 227, 230, 233, 234, 235 R, 229

[56] References Cited

U.S. PATENT DOCUMENTS

| 3,341,211 | 9/1967 | Houghton et al. | 277/230 X |
| 3,932,008 | 1/1976 | McCloskey et al. | 277/DIG. 6 X |
| 4,417,733 | 9/1983 | Usher | 277/DIG. 6 X |
| 4,423,544 | 1/1984 | Kashmerick et al. | 277/DIG. 6 X |
| 4,516,782 | 11/1985 | Usher | 277/DIG. 6 X |
| 4,559,248 | 4/1985 | Sumiyoshi et al. | 277/DIG. 6 X |
| 4,559,249 | 9/1985 | Arigaya et al. | 428/253 X |
| 4,607,851 | 12/1986 | Usher | 277/30 X |

FOREIGN PATENT DOCUMENTS 54-76759  6/1979  Japan .
58-24620  2/1983  Japan .

*Primary Examiner*—David Simmons
*Attorney, Agent, or Firm*—Nixon & Vanderhye

[57] ABSTRACT

A method of manufacturing a spherical sealing body for use in exhaust pipe joints, including the steps of; laminating a flexible refractory sheet and a flexible wire net with each other, winding the laminated refractory sheet and the wire net to thereby form a cylindrical member, laminating the other flexible refractory sheet and an unsintered tape or film made of a polytetrafluoroethylene resin to each other, compressing to integrate the laminated other refractory sheet and the unsintered tape or film in a direction of the thickness thereof to thereby form an sliding face member, winding the sliding face member to an outer circumferential surface of the cylindrical member to thereby form a cylindrical preform body, and applying compression to the preform body in an axial direction of the preform body, and a spherical sealing body for use in exhaust pipe joints manufactured by the method above mentioned.

4 Claims, 3 Drawing Sheets

SPHERICAL SEALING BODY USED FOR THE EXHAUST PIPE JOINTS AND A METHOD OF MANUFACTURING THEREOF

BACKGROUND OF THE INVENTION

The present invention relates to a spherical sealing body used for exhaust pipe joints in automobiles and a method of manufacturing thereof.

A spherical sealing body used for exhaust pipe joints is disclosed, for example, in Japanese Patent Application Laying Open No. 54-76759 (hereinafter referred to as "related art I"). The spherical sealing body disclosed in the related art I has heat resistance, excellent fitness with mating members and remarkably improved impact shock resistance but it involves, on the other hand, a drawback of often generating abnormal frictional noise during sliding movement under dry frictional conditions.

It is considered that the above-mentioned drawback in the sealing body is due to the great difference between the static friction coefficient and the kinetic friction coefficient of heat resistance material constituting the sealing body (expansive graphite, etc.) and also to that the frictional resistance of the sealing body made of such heat resistance material relative to the sliding velocity shows a negative resistance (that is, a phenomenon in which the friction coefficient is reduced in accordance with the increase in the sliding velocity).

In view of the above, the present applicant has already proposed a sliding (sealing) member which can overcome the foregoing drawback and suitably be used to exhaust pipe joints in Japanese Patent Application No. 56-120701 (Japanese Patent Laying Open No. 58-24620) (hereinafter referred to as "related art II").

That is, the sealing body in the related art II is prepared by molding refractory material as a mixture of one or more of expensive graphite, mica and asbestos together with reinforcing material comprising metal fibers, fine metal wires or metal gages obtained by weaving or knitting them, in which a lubricant composition comprising a polytetrafluoroethylene resin or a copolymer of tetrafluoroethylene and hexafluoropropylene is deposited to the surface of the sealing body.

In this sealing body, the lubricant composition deposited to the surface thereof can provide effects of reducing the friction coefficient, prevention of the refractory matrix material from transferring to mating members, reduction of the difference between the static friction coefficient and kinetic friction coefficient, etc., in addition, the tetrafluoroethylene resin does not show negative frictional resistance relative to the sliding velocity, consequently, there can be obtained an advantageous effect of suppressing the generation of self-excited vibrations due to "deposition-sliding", thereby contributing to the prevention for the generation of abnormal frictional noise in addition to the foregoing effect.

Now it has been found that although the sealing body based on the related art II described above can overcome the drawbacks in the related art I in view of the performance, there is a problem in this case for the method of manufacturing the sealing body.

The method of manufacturing the sealing body in the related art II is as described below.

(1) A method of coating adhesives to the surface of a sealing body substrate obtained by molding refractory material and reinforcing material together, and then scattering and depositing a tetrafluoroethylene resin powder thereover, or (2) a method of properly diluting a mixture of a tetrafluoroethylene resin powder and adhesives with a volatile solvent, brush-coating or spraying the solution to the surface of the sealing body substrate, or (1) a method of coating adhesives to the surface of a sheet-like refractory material and then scattering and depositing a tetrafluoroethylene resin powder or (2) a method of properly diluting a mixture of a tetrafluoroethylene resin powder and adhesives with a volatile solvent and then brush-coating or spraying the solution to the surface of the sheet-like refractory material.

Any of the former methods of depositing the tetrafluoroethylene resin to the surface of the sealing body substrate requires an additional step of compressing the sealing body substrate again in a mold for adjusting the size and smoothing the surface after the deposition. In the latter methods, the method (1) requires a step of coating adhesives and the method (2) of applying brush coating brings about a difficulty in thin and uniform coating on the surface of the sheet-like refractory material. Accordingly, a method of depositing by means of spraying has been recommended in view of practical use.

However, although the method of depositing the solution by means of spraying to the surface of the sheet-like refractory material enables thin and uniform deposition on the surface, it has been found that a considerably great amount of the tetrafluoroethylene resin scatters around the sheet-like refractory material to cause loses in the tetrafluoroethylene resin, that is, poor material yield.

SUMMARY OF THE INVENTION

The first object of the present invention is to provide a method of manufacturing a spherical sealing body for use in exhaust pipe joints capable of improving the material yield and remarkably improving the operationability while keeping advantages of the related art II in view of the performance as they are.

The second object of the present invention is to provide a spherical sealing body for use in exhaust pipe joints causing less self-excited vibrations and, thus, less generation of abnormal frictional noise.

According to the present invention, the foregoing first object can be attained by the following methods, that is, a method of manufacturing a spherical sealing body for use in exhaust pipe joints, comprising the steps of;

laminating a first flexible refractory sheet and a flexible wire net to each other, winding said laminated first refractory sheet and said wire net such that said wire net is situated at the outermost circumference to thereby form a cylindrical member, laminating a second flexible refractory sheet and an unsintered tape or film made of a polytetrafluoroethylene resin to each other, compressing to integrate said laminated second refractory sheet and said unsintered tape or film in a direction of the thickness thereof to thereby form a sliding face member, winding said sliding face member to an outer circumferential surface of said cylindrical member such that said unsintered tape or film is situated to an outside to thereby form a cylindrical preform body, and applying compression to said preform body in an axial direction of said preform body so as to form a main body of said sealing body by entangling to integrate said first refractory sheet and said wire net and so as to form a surface layer made of said resin to a spherical portion of said main body by integrating said cylindrical member with said sliding face member, or a method of manufacturing a spherical sealing body for use in exhaust pipe joints, comprising the steps of;

laminating an unsintered tape or film made of a tetrafluoroethylene resin over a predetermined length at one end on one surface of a flexible refractory sheet, compressing to integrate said laminated refractory sheet and said unsintered tpe or film in the direction of thickness thereof, laminating a flexible wire net to the other surface of said refractory sheet integrated with said unsintered tape or film, winding said laminated refractory sheet and said wire net such that said unsintered tape or film integrated with said refractory sheet is situated to an outermost circumference thereof to thereby form a cylindrical preform body and applying compression to said preform body in an axial direction of said preform body so as to form a main body of said sealing body, and form a surface layer made of said resin to a spherical portion of said main body, by entangling to integrate said first refractory sheet and said wire net.

According to the method of the present invention, since the polytetrafluoroethylene resin is used in the form of unsintered tape or film, the handling is facilitated and the material yield can be improved remarkably.

Since the unsintered tape or film and the flexible refractory sheet, or the unsintered tape or film, the flexible refractory sheet and the flexible wire net are press-bonded and integrated by the compression in the direction of the thickness, firm bonding can be obtained without using adhesives as in the related art and, since the sliding face member can be handled as a unitary member, the operationability can be improved.

In a casee where the wire net and the flexible refractory sheet are compressed in adjacent with each other, since the meshes of the wire net are filled with the refractory sheet by its easy flexibility, both of them can be integrated firmly. Further, in a case where the wire net and the unsintered tape or film are compressed in adjacent with ether other, since the surface of the unsintered tape or film is press-bonded in an unevenned state due to the flexibility of the unsintered tape or film, both of them can be integrated firmly. Accordingly, if the wire net, the refractory sheet and the unsintered tape or film are laminated in this order and compressed, an unevenned surface is formed, in which the refractory sheet fills the meshes of the wire net and the wire net is partially exposed, and the unsintered tape or film is press-bonded to the unevenned surface. Accordingly, they are integrated by press-bonding more firmly than the case without using the wire net. Particularly, in the case of laminating and compressing the refractory sheet, the unsintered tape or film and the wire net in this order, since the refractory sheet and the unsintered tape or film form an unevenned press-bonded surface, integration under stronger press-bonding can be attained as compared with the case of not using the wire net.

The refractory sheet used in the method according to the present invention is preferably made of expansive graphite, mica or asbesto and, more specifically, suitable expansive graphite is "Grafoil (trade name)", manufactured by Union Carbide Co. in U.S.A. as disclosed in Japanese Patent Publication No. 44-23966, or "Nicafilm (trade name)" manufactured by Nippon Carbon Co. As the mica, mica paper bonded with silicon is suitable and, as asbesto, chrysotile or amosite type asbesto paper or sheet is suitable.

A step of compressing the refractory sheet made of expansive graphite and the wire net in the direction of the thickness thereby integrating them in the method according to the present invention is preferably carried out by using calendering or pressing.

Preferred wire nets used in the present invention, are those prepared by weaving or knitting metal fibers or fine metal wires such as of stainless steels, for example, austenite SUS 304, SUS 316 (corresponding to JIS-G-430g: AISI-304, 316 respectively) and ferrite SUS 430 (corresponding to JIS-G-430g: AISI-430), iron wire, zinc plated iron wire (JIS G-3532: corresponding to ASTM A641) having mesh size preferably from 3 to 5 mm.

As the resin sheet made of the tetrafluoroethylene resin used in the present invention, unsintered films or tapes of about 0.05-0.5 mm thickness are preferred and there can be mentioned, for example, unsintered films or unsintered tapes of polytetrafluoroethylene resin manufactured by the paste extrusion molding method from fine powder of tetrafluoroethylene resin (Teflon 6J, Polyflon F101, Fluon CD1: all in trade name) as suitable sheet.

According to the present invention, the foregoing second object can be attained by a spherical sealing body for use in exhaust pipe joints manufactured by any one of the methods according to the present invention described above.

In the spherical sealing member for use in an exhaust pipe joint according to the present invention, since a surface layer made of the tetrafluoroethylene resin or a composite surface layer comprising the tetrafluoroethylene resin and the wire net is formed at the spherical portion of the sealing, the frictional coefficient at the spherical portion of the sealing body can be reduced, transfer of the refractory material constituting the main body of the sealing body to the abutting portion of the exhaust pipe can be prevented and difference between the static friction coefficient and the kinetic friction coefficient can be reduced. In addition, since the tetrafluoroethylene resin does not show a negative frictional resistance relative to the sliding velocity, it is possible to suppress the generation of self-excited vibrations due to "deposition-sliding" and, accordingly, to prevent the generation of abnormal frictional noise.

Particularly, in the spherical sealing body for use in exhaust pipe joints according to the present invention in which the composite surface layer comprising the tetrafluoroethylene resin and the wire net is formed to the spherical portion, when it is used for exhaust pipe joints, after the tetrafluoroethylene resin of the composite surface layer has been abrased to such an optimal shape as fitting the shape of the mating portion of the exhaust pipe, since the wire net in the composite surface layer inhibits the further development of the abrasion in the tetrafluoroethylene resin, it can improve and maintain the effect of sealing, as well as an effect of preventing the generation of abnormal frictional noise.

Further objects and advantages of the present invention will be apparent from the following description, reference being had to the accompanying drawings wherein preferred embodiments of the present invention are clearly shown.

DESCRIPTION OF THE PREFERRED EMBODIMENTS

Figure 1:
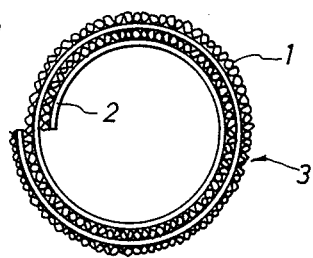
FIG. 1 is a plan view illustrating a cylindrical member in Example I for the manufacturing method according to the present invention.

The present invention is to be described by way of its examples referring to the drawings.

EXAMPLE I a. First Step

A knitted wire net 1 of 3 mm mesh size is prepared by using SUS 403 fine metal wire having 0.28 mm wire diameter. Further, an expansive graphite sheet of 0.5 mm thickness ("Nicafilm", manufactured by Nippon Carbon Co.) is used as an expansive graphite sheet 2.

Then, after laminating the refractory sheet 2 to the wire net 1, they are wound such that the refractory sheet 2 is situated at the inside and the wire net 1 is situated at the outermost circumference to prepare a cylindrical member 3 (FIG. 1).

b. Second Step

Figure 2:
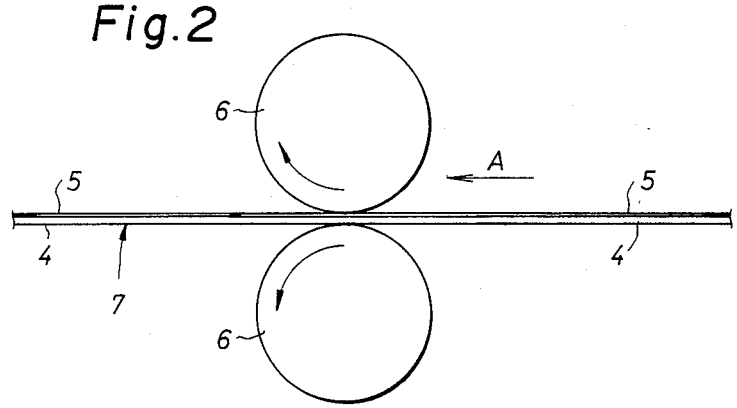
FIG. 2 is a side elevational view illustrating the sliding face member before and after the press bonding.

An unsintered tape 5 of a tetrafluoroethylene resin with 0.1 mm thickness is laminated on an expansive graphite sheet 4 with 0.5 mm thickness, they are passed between rollers 6, 6 in the direction of an arrow A to thereby prepare a sliding face member 7 in which the unsintered tape 5 of the tetrafluoroethylene resin is press-bonded to integrate to one surface of the expensive graphite sheet 4 (FIG. 2).

c. Third Step

Figure 3:
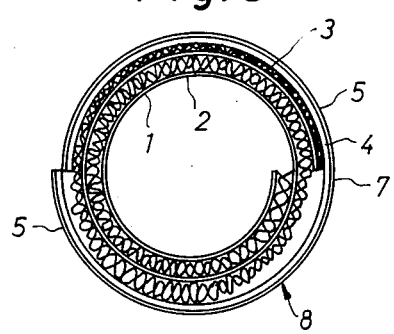
FIG. 3 is a plan view illustrating a preform body.

The sliding face member 7 obtained in the second step described above is wound around the outer circumferential surface of the cylindrical member 3 obtained in the first step with the tetrafluoroethylene resin layer being situated to the outside to prepare a preform member 8 (FIG. 3).

d. Fourth Step

Figure 4:
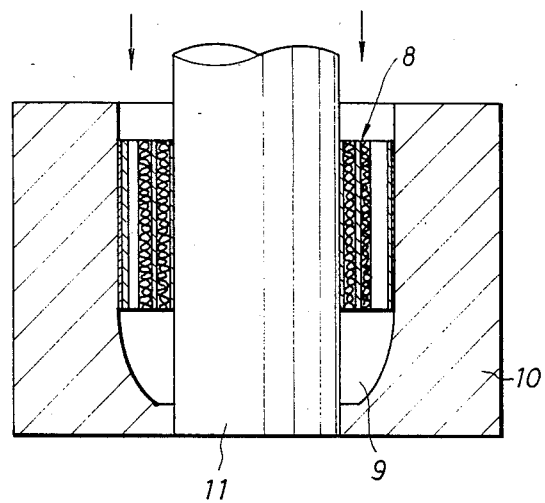
FIG. 4 is a cross sectional view illustrating the compression step.

The preform member 8 is tightly fitted over the outer circumferential surface of a core 11 in a mold 10 having a partial spherical surface portion 9 at the inner side thereof, and the preform member 8 is compressed in the axial direction thereof to obtain a spherical sealing body (FIG. 4).

In this step, the wire net 1 and the refractory sheet 2 of the cylindrical member 3 are entangled to form an integrated sealing main body and the sliding face member 7 integrated with the main body is formed to the spherical sliding surface of the main body with the tetrafluoroethylene resin as the surface layer.

Figure 5:
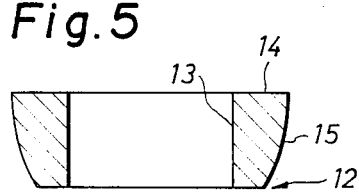
FIG. 5 is a cross sectional view illustrating the spherical sealing body according to the present invention.

FIG. 5 is a logitudinal cross sectional view illustrating a spherical sealing body 12 obtained by way of the first through fourth steps, in which there are shown an inner hole 13 along which the refractory sheet 2 is exposed, an end face 14 and a spherical sliding face 15 made of the tetrafluoroethylene resin layer.

EXAMPLE II a. First Step

A knitted wire net 1 of 3 mm mesh size is prepared by using SUS 430 fine metal wire having 0.28 mm wire diameter. Further, an expansive graphite sheet of 0.5 mm thickness ("Nicafilm", manufactured by Nippon Carbon Co.) is used as an expansive graphite sheet 2.

Figure 6:
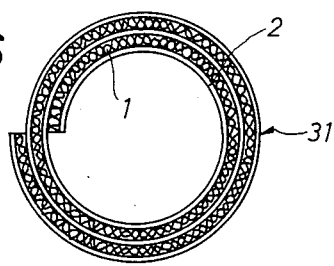
FIG. 6 is a plan view illustrating the cylindrical member of Example II.

Then, after laminating the refractory sheet 2 to the wire net 1, they are wound such that the refractory sheet 2 is situated at the inside and the wire net 1 is situated at the outermost circumference to prepare a cylindrical member 31 (FIG. 6).

b. Second Step

Figure 7:
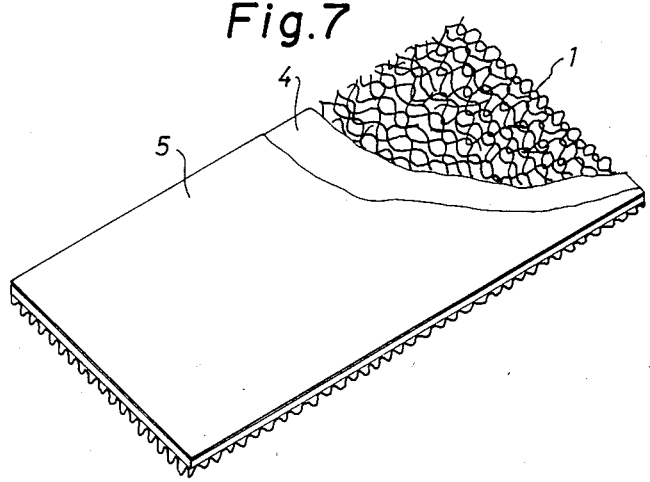
FIG. 7 is a perspective view illustrating the sliding face member before press bonding.
Figure 8:
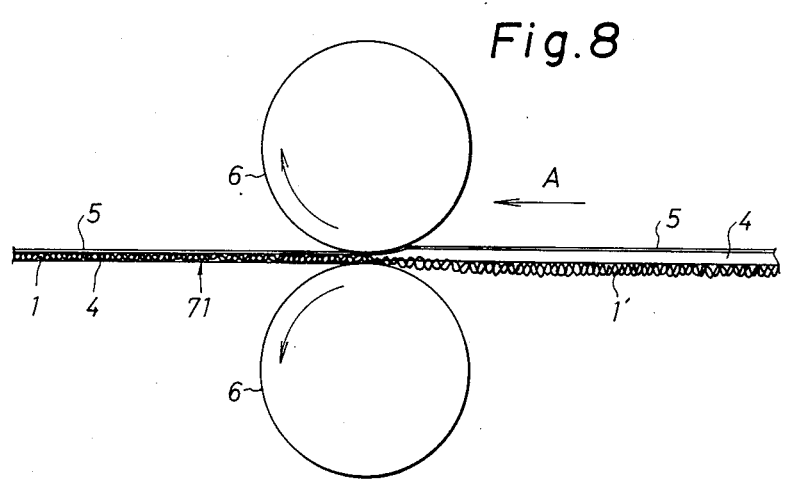
FIG. 8 is a side elevational view illustrating the sliding face member before and after the press bonding.
Figure 9:
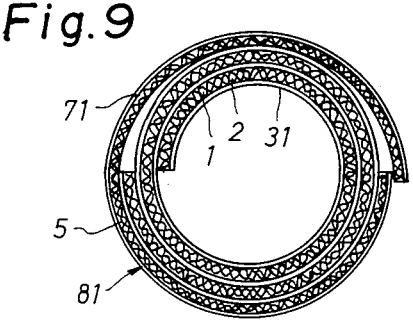
FIG. 9 is a plan view illustrating the preform molding body.

After laminating an expansive graphite sheet 4 of 0.5 mm thickness over a separately prepared wire net 1' of a predetermined length, and an unsintered tape 5 of a tetrafluoroethylene resin of 0.1 mm thickness further over the expansive graphite sheet 4 (FIG. 7), they are passed between rollers 6, 6 in the same manner as in Example I to prepare a sliding face member 71, in which the wire net 1' and the expansive graphite sheet 4 and the tetrafluoroethylene resin unsintered tape 5 are integrated with each other (FIG. 8).

In this step, since the expansive graphite sheet 4 fills the meshes of the wire net 1 by means of easy moldability and flexibility of the sheet itself and the wire net 1 is partially exposed to form an unevenned surface at the boundary after press-bonding the expansive graphite sheet 4 and the wire net 1, the tape 5 of the tetrafluoroethylene resin disposed over the expansive graphite 4 is press-bonded to this unevenned surface to attain more firm integration.

c. Third Step

The sliding face member 71 obtained in the second step is wound over the outer circumferential surface of the cylindrical member 31 obtained in the first step with the tetrafluoroethylen resin layer being situated to the outside to prepare a preform member 81.

d. Fourth Step

A spherical sealing body is obtained in the same procedures as in Example I fro the preform member 81.

EXAMPLE III a. First Step

Figure 10:
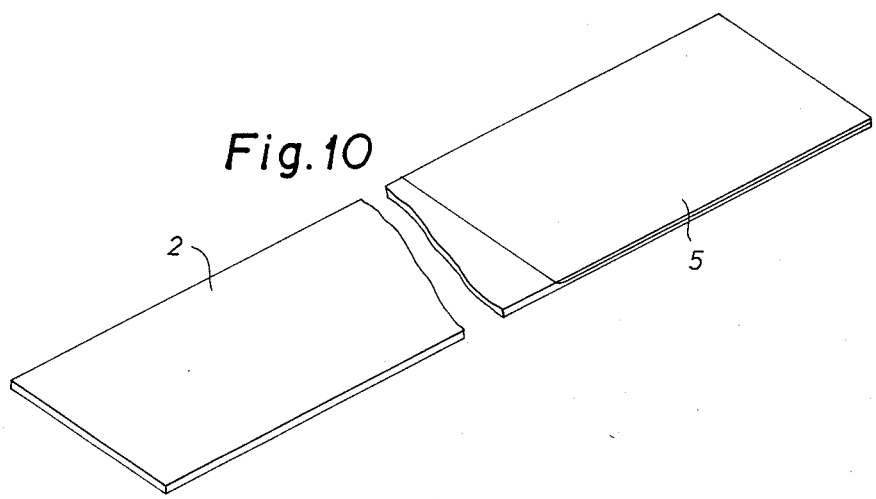
FIG. 10 is a perspective view illustrating a refractory sheet material in which a tetrafluoroethylene resin tape is press bonded and integrated with the surface.
Figure 11:
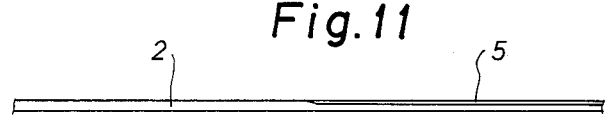
FIG. 11 is a cross sectional view of FIG. 10.

An expansive graphite sheet of 0.5 mm thickness ("Nicafilm", manufactured by Nippon Carbon Co.) is used as the refractory sheet 2 and, after laminating an unsintered tape 5 of tetrafluoroethylene resin of 0.1 mm thickness on the surface at one end of the refractory sheet 2, they are press-bonded to integrate by being passed between rollers (FIG. 10, FIG. 11).

b. Second Step

Figure 12:
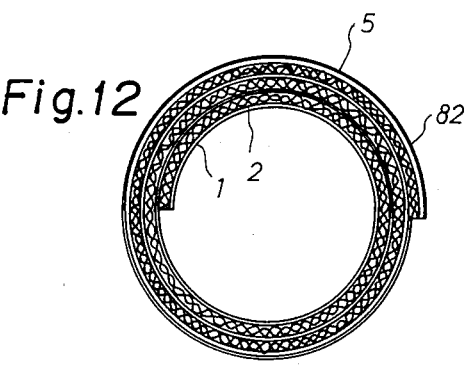
FIG. 12 is a plan view illustrating a preform molding body.

A knitted wire net 1 of 3 mm mesh size is prepared by using SUS 403 as fine metal wire having 0.28 mm wire diameter. Then, after laminating the wire net 1 over the refractory sheet 2, they are wound with the refractory sheet 2 being at the inside and the unsintered tape 5 of tetrafluoroethylene press-bonded and integrated with the refractory sheet material 2 being situated to the outermost circumference to prepare a preform member 82 (FIG. 12).

c. Third Step

From the preform member 82, a spherical sealing body is obtained in the same procedures as in Example I.

The spherical sealing body obtained through the manufacturing steps in Example I through Example III described above show the same effects as those in the spherical sealing body in the prior art II, regarding frictional characteristics, prevention for the generation of unpleasant sounds and tightly sealing function.

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of manufacturing a spherical sealing body for use in exhaust pipe joints, comprising the steps of;

laminating a first flexible refractory sheet and a flexible wire net to each other, winding said laminated first refractory sheet and said wire net such that said wire net is situated at the outermost circumference to thereby form a cylindrical member, laminating a second flexible refractory sheet and an unsintered tape or film made of a polytetrafluoroethylene resin to each other, compressing to integrate said laminated second refractory sheet and said unsintered tape or film in a direction of the thickness thereof to thereby form a sliding face member, winding said sliding face member to an outer circumferential surface of said cylindrical member such that said unsintered tape or film is situated to an outside to thereby form a cylindrical preform body, and applying compression to said preform body in an axial direction of said preform body so as to form a main body of said sealing body by entangling to integrate said first refractory sheet and said wire net and so as to form a surface layer made of said resin to a spherical portion of said main body by integrating said cylindrical member with said sliding face member.

2. A spherical sealing body for use in exhaust pipe joints manufactured by the method according to claim 1.

3. A method of manufacturing a spherical sealing body for use in exhaust pipe joints, comprising the steps of;

laminating an unsintered tape or film made of a tetrafluoroethylene resin over a predetermined length at one end on one surface of a flexible refractory sheet, compressing to integrate said laminated refractory sheet and said unsintered tape or film in the direction of thickness thereof, laminating a flexible wire net to the other surface of said refractory sheet integrated with said unsintered tape or film, winding said laminated refractory sheet and said wire net such that said unsintered tape or film integrated with said refractory sheet is situated to an outermost circumference thereof to thereby form a cylindrical preform body, and applying compression to said preform body in an axial direction of said preform body so as to form a main body of said sealing body and form a surface layer made of said resin to a spherical portion of said main body, by entangling to integrate said first refractory sheet and said wire net.

4. A spherical sealing body for use in exhaust pipe joints manufactured by the method according to claim 3.

* * * * *